Sept. 1, 1936.   C. J. CRANE ET AL   2,053,182
BANK AND TURN INDICATOR
Filed Aug. 11, 1930   3 Sheets-Sheet 1
FIG. 1.
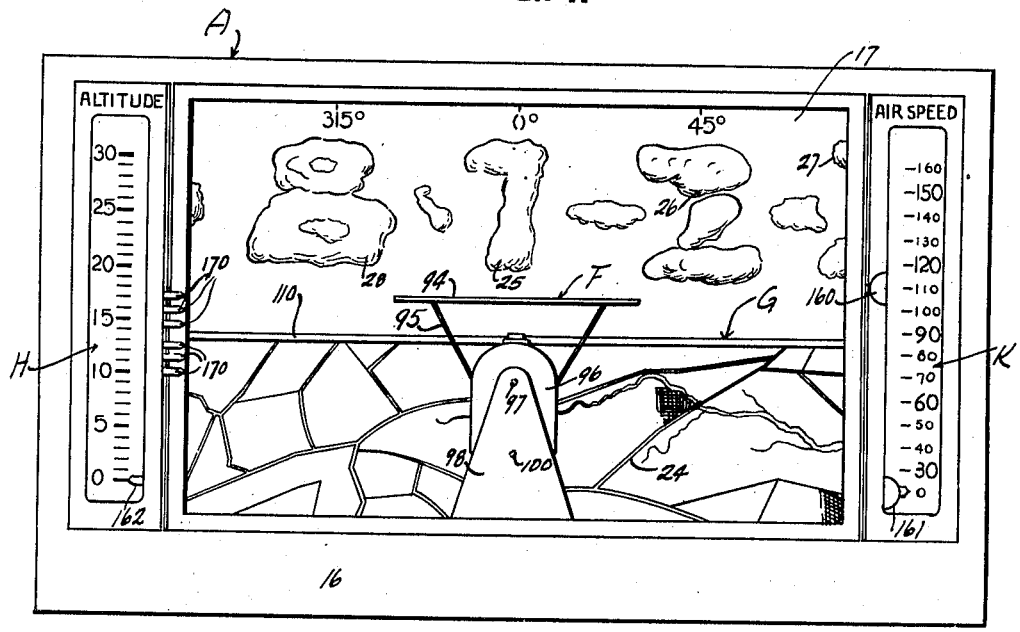
FIG. 2.
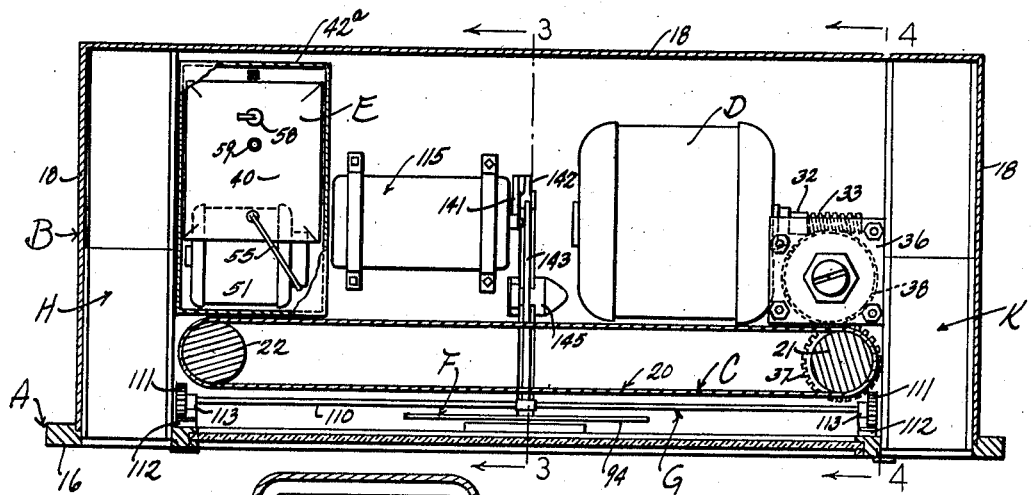
FIG. 10.
INVENTORS
Carl J. Crane
William C. Ocker
BY Lancaster, Allwine and Rommel
ATTORNEYS.

Sept. 1, 1936. C. J. CRANE ET AL 2,053,182
BANK AND TURN INDICATOR
Filed Aug. 11, 1930 3 Sheets-Sheet 2
FIG. 3.
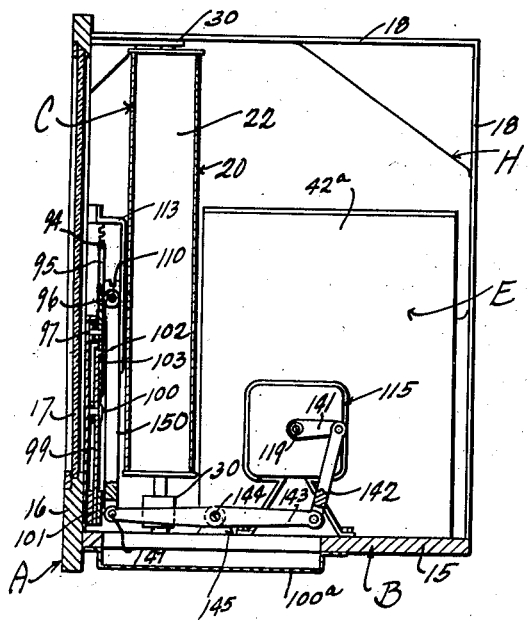
FIG. 4.
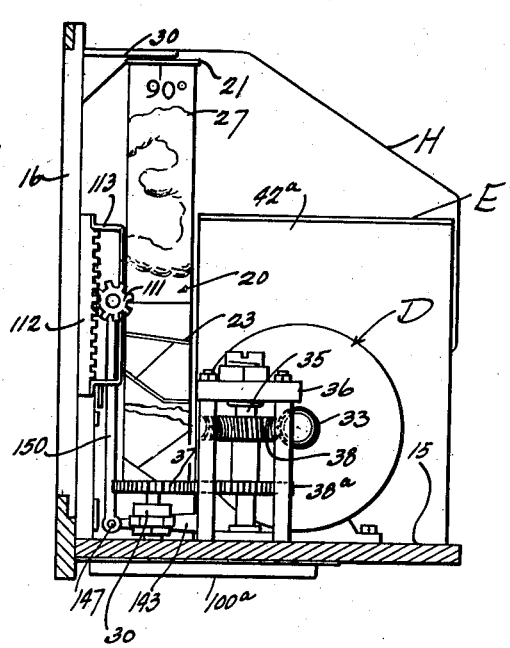
FIG. 5.
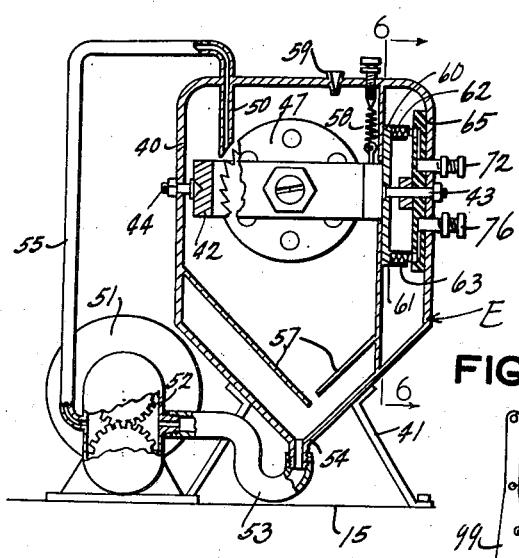
FIG. 6.
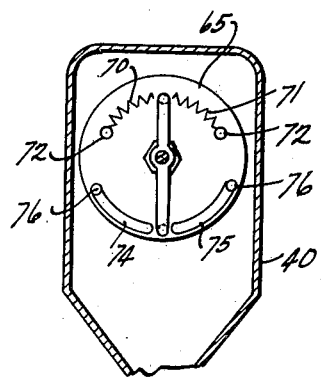
FIG. 11.
INVENTORS.
Carl J. Crane
William C. Ocker
BY Lancaster, Allwine and Rommel
ATTORNEYS.

Sept. 1, 1936.  C. J. CRANE ET AL  2,053,182
BANK AND TURN INDICATOR
Filed Aug. 11, 1930   3 Sheets-Sheet 3
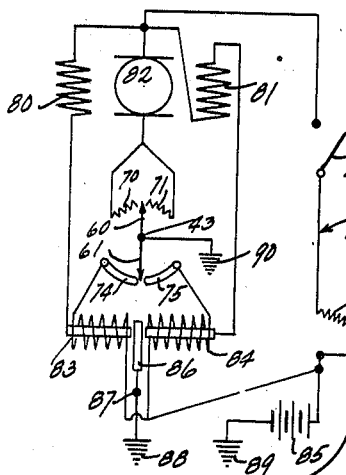
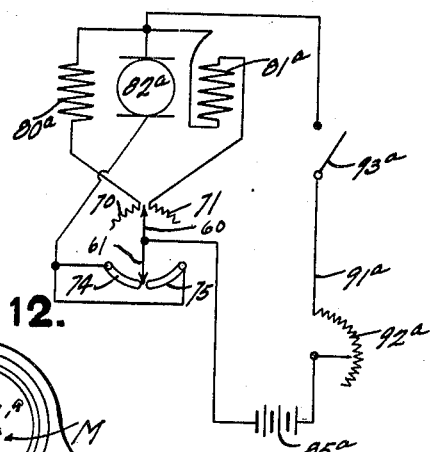
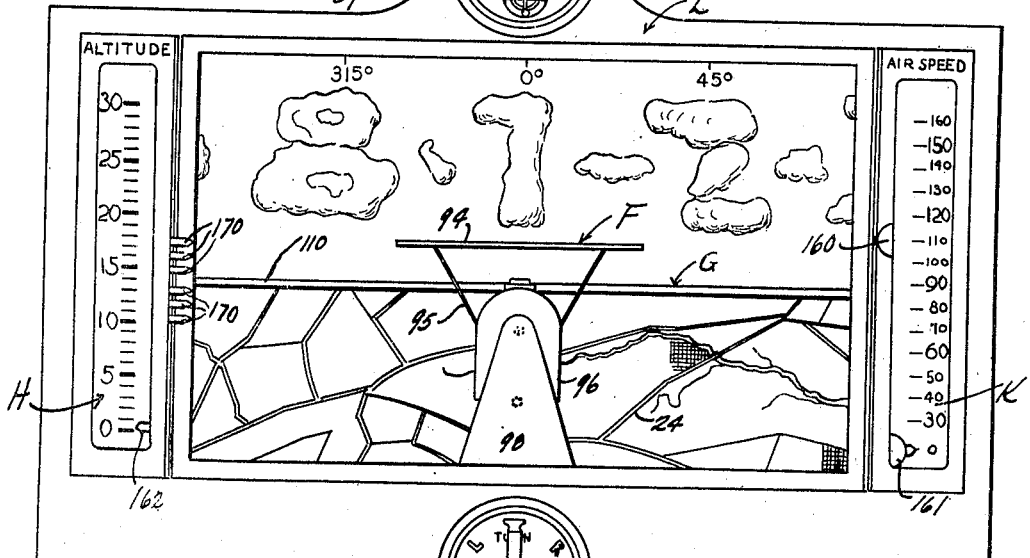
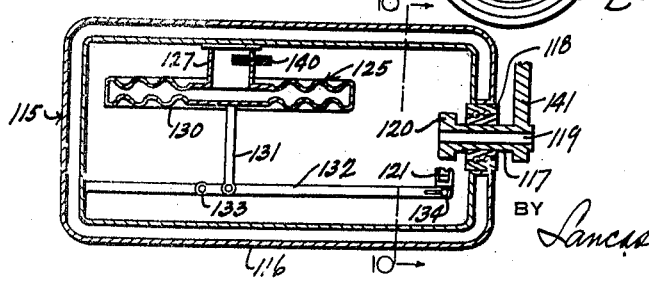
INVENTORS.
Carl J. Crane
William C. Ocker
BY Lancaster, Allwine and Rommel
ATTORNEYS.

Patented Sept. 1, 1936

2,053,182

UNITED STATES PATENT OFFICE 2,053,182

BANK AND TURN INDICATOR

Carl J. Crane and William C. Ocker,
Brooks Field, Tex.

Application August 11, 1930, Serial No. 474,540

17 Claims. (Cl. 33—204)

This invention relates to improvements in instruments to facilitate aerial flight, particularly relating to an integrating device and corelated series of instruments in such unitary arrangements as will enable the proper control and flight of an aircraft by "blind" or "instrument" flying.

Numerous instruments have heretofore been provided as an aid to the pilots of aircraft for the purpose of indicating or seeking to indicate the attitude of the aircraft without external visual reference, that is, terrestrial or astronomical reference. It has been definitely proven by Captain William C. Ocker that a pilot using present flight instruments will suffer from vertigo in the absence of external terrestrial or astronomical reference, due to movements of the aircraft. A psychological condition is brought about when the aircraft pilot has to read and interpret even a limited number of instruments of the present type. The effect may well be likened to that of a person being subjected to the "third degree"; the necessary self integration which the pilot has to make producing a condition of vertigo, and loss of ability to think clearly and act expeditiously and with safety. This condition has proven to be fundamentally true in even the most perfect of physical specimens. It is therefore a primary object of this invention to provide a unitary instrument wherein is provided a fairly large artificial field of view that bears relative movement to angular deviations in aircraft flight and will convey to the pilot a direction of turn, as well as the intensity and approximate magnitude of turn; stimulating him with a visual factor which will obviate the condition of vertigo.

It is a further object of this invention to provide a unitary arrangement of instruments for an aircraft pilot which will require but little interpretative effort upon the part of the pilot, and which at the same time will given the pilot all necessary indications of flight.

It is a further object of this invention to provide a flight integrator which is capable of inhibiting and counteracting the illusion of turn in an opposite direction after turning movements, such as a tail spin or spiral movement of an aircraft after completion, and thus preventing the pilot from erroneously operating the aircraft controls, such as has many times resulted in a fatal second tail spin.

A further object of this invention consists in the provision of an improved gyroscopically controlled aircraft turn indicating screen.

A further object of this invention consists in the provision of an improved gyroscopically controlled aircraft turn indicating screen positioned with respect to a pilot's field of view in a co-related arrangement with an inclinometer.

A further object of this invention consists in the provision of an improved gyroscopically controlled aircraft turn indicating screen positioned with respect to a pilot's field of view in a co-related arrangement with an inclinometer and in a further co-relation with a rise and fall indicator.

It is a further object of this invention to provide an improved aircraft control indicator which will give the pilot a visual stimulus similar to the normal flight stimulus, when flying "blind", as in a fog.

Other objects and advantages of this invention will be apparent during the course of the following detailed description.

In the accompanying drawings, forming a part of this specification, and wherein similar reference characters designate corresponding parts throughout the several views, Figure 1 is a front elevation of the improved instrument, which is demountable as a unit and adapted to be mounted upon the instrument board of any type of aircraft.

Figure 2 is a plan view, partly in section, showing the arrangement of details of the improved unit and integrator.

Figure 3 is a transverse sectional view taken through details of the instrument substantially on the line 3—3 of Figure 2.

Figure 4 is an end view, partly in section, of the improved integrator, taken substantially on the line 4—4 of Figure 2.

Figure 5 is a fragmentary view, partly in section, of a gyroscope element for controlling the flow of current through the motor which operates the screen of the integrator.

Figure 6 is a fragmentary sectional view taken substantially on the line 6—6 of Figure 5.

Figures 7 and 8 are diagrammatic views showing preferred and modified or alternate wiring for the power unit or motor which drives the belt of the indicator.

Figure 9 is a sectional view taken through a statoscope portion of the rise and fall indicator.

Figure 10 is a sectional view taken substantially on the line 10—10 of Figure 9.

Figure 11 is a partially diagrammatic view of a damper used on the pendulum of the inclinometer.

Figure 12 is a modified view of an indicator embodying and utilizing a gyroscope which performs the additional function of a turn indicator for the aircraft.

In the drawings, wherein for the purpose of illustration are shown preferred and modified forms of the invention, the letter A (Fig. 1) may generally designate the improved unitary integrator. It includes a casing or support B to be mounted on the instrument board or otherwise affixed to the aircraft, and supports an improved integrating turn indicator apparatus C including a belt or screen 20, and power unit in the nature of a motor D, and a gyroscopic apparatus E for controlling the operation of the motor D. In co-related field of view association with the turn indicating belt 20 there is provided a gravity inclinometer F, and a statoscopically operated rise and fall indicator G. As shown in Figure 1 of the drawings the instrument has compactly and cooperatively associated therewith an altimeter H and an air speed instrument K. The modified form of invention L shown in Figure 12 possesses many of the characteristics and operating devices of the form of invention A, such as hereinafter mentioned, and there is additionally provided a compass M and a gyroscope E' which performs all the functions of the gyroscope E of the form of invention A and is additionally provided with an indicator and dial on the face of the instrument L to conventionally designate the turn of the aircraft.

The case B, it is to be understood, may vary widely in shape and size. In the preferred instance it includes a base 15, preferably having a rigidly fixed front wall 16 provided with a transparent panel 17 of glass, pyroxyline or any other approved material which will enable the pilot to observe the indicia within the casing. The case B preferably also includes detachable top, bottom and rear walls 18, which may be assembled in any approved manner. The shape of the casing is such that the front wall panel 17 is preferably of horizontally elongated substantially rectangular form.

The screen element 20, which is in fact the turn indicating element, in the preferred instance, is in the form of an endless belt, although it may be in the form of any type of movable screen, cylinder, disc, cone or sphere, with sufficient surface area to depict thereon a view similar to a typical flight view seen by a pilot during flight. The flexible endless belt 20 travels in a rectilinear path from left to right, and vice versa, and at its ends it is trained about driven and idler rollers 21 and 22 respectively, which are preferably positioned upon vertical axes. The belt element 20 is preferably of the same height as the transparent panel 17, and the rollers 21 and 22 are preferably located at the ends of the transparent panel, so that substantially one-half of the external surface area of the belt element 20 is visible through the panel. The external surface area of the belt element 20 is preferably provided, as above mentioned, with a vertical view, similar to a panoramic view seen during flight, preferably consisting of a horizon having a terrestrial view 24 depicted therebelow, and a sky area thereabove, which may be colored blue, and have spaced clouds therealong as indicated by numerals 25, 26, 27 and 28. The rollers 21 and 22 are suitably mounted in anti-friction or other type of bearings or brackets 30 at the upper and lower ends thereof; the lower bearings 30 preferably being thrust bearings.

The motor D is suitably mounted to the rear of the belt element 20 on the base 15, as shown in Figures 2 and 4 of the drawings, and it is provided with a horizontal drive shaft 32 provided with a worm 33 keyed therewith which meshes with a worm wheel 38 rotatably mounted on a vertically disposed shaft 35; the latter bearing in a suitable bracket arrangement 36 mounted upon the base 15 adjacent to the lower end of the roller 21. The roller 21 at its lower end is provided with a gear 37 intermeshing with a gear 38ª keyed with the shaft 35, as shown in Figure 4. Obviously, rotation of the shaft of the motor D, through the worm and other gearing will cause rotation of the roller 21, and correspondingly move the belt 20 across the rear of the panel 17.

The motor D is preferably of the shunt-wound type, the current through which is controlled by the gyroscope mechanism E for causing a left to right or vice versa movement of the belt element 20, for indicating to the pilot the right or left turn of the aircraft; the typical artificial horizon view depicted upon the screen giving the pilot a visual stimulus similar to the normal flight stimulus experienced by the pilot.

The motor D is of the direct current type, having two or more field coil windings. It is a shunt-wound motor in the preferred instance because it is desirable to have constant speed characteristics under changing loads. The variation in speed of the motor is governed entirely by the gyroscopic device E to be subsequently described.

Prior to describing the wiring diagram through which the circuit operates, construction of the gyroscope E will be described. It consists of a housing or casing 40 suitably mounted at 41 upon the base 15, and the entire gyroscopic device E may be enclosed within an independent housing 42ª if desired. The gyroscope E includes mechanism arranged similar to that of the conventional turn indicator. It has a pivotally mounted frame 42 supported upon spindles, pivots, or bearings 43 and 44, one or more of which may be adjustable if desired, and supporting the frame 42 for movement on a horizontal axis. This axis is aligned with the flight path. In the frame 42 a gyroscopic rotor wheel or element 47 is mounted, with its spin axis in a horizontal plane, and normal to the flight path. The frame 42 and gyroscopic wheel 47 may be of the nature of and similarly mounted to the corresponding parts shown in U. S. Patent #1,433,102; the external periphery of the wheel 47 being provided with suitable teeth, vanes, or depressions adapted to receive the impulse of the air or fluid jet from a nozzle 50.

The gyroscope is preferably driven by a positive fluid pressure set up by an electrically driven pump 51 which is provided with suitable means 52 therein for taking the fluid, which may be air or any other desirable fluid, and withdrawing it through a conduit 53 from the bottom-most location 54 of the otherwise closed or vented casing 40, and transmitting it through a conduit 55 to the nozzle 50.

Thus, the fluid is scavenged from the gyroscope casing 40. The bottom walls of the casing or housing 40 may be convergent to the location 54, and within the housing there are preferably provided two or more baffle plates 57 for so controlling the fluid as to prevent interference with the gyroscopic rotor and the circuit maker and breaker device operates within the casing 40 by the precessing of the gyroscope. It is quite apparent that the gyroscopic frame 42 will precess when an attempt is made to change the direction of flight of the aircraft from a straight path, as by lateral turning of the aircraft, in accordance with principles well understood by those familiar with the art relating to gyroscopically controlled turn indicators. The frame 42 is preferably damped by means of an adjustable spring device 58 of any approved type. A suitable vent plug 59 may be provided in the housing 40, if desired.

The frame 42 of the gyroscope has keyed therewith oppositely extending arms 60 and 61, respectively provided with spring urged electrically conductive contacts or brushes 62 and 63, facing parallel with the pivot axis of the mounting 43, and operating over a suitable insulation disc 65 which is mounted within the housing 40. This disc 65 is provided with a pair of rheostat coils or zig-zag wire windings 70 and 71, which may be relatively insulated from each other, and provided with suitable terminal contacts 72 by means of which to connect the same in the motor circuit. The brush 62 of the gyroscopically controlled switch operates over the coils 70 or 71, depending upon the direction of turn of the aircraft, and thus serving as rheostats for the motor circuit, for the purpose of designating the intensity of turn in a manner which will be apparent. Relatively insulated strip contacts 74 and 75 are also mounted upon the insulation 65, with any suitable terminal posts 76 leading exteriorly of the housing 40, to which the wires of the motor circuit may be connected; the brush 63 operating over these conductor strips 74 and 75 for purposes to be subsequently described.

Referring to the wiring diagram shown in Figure 7, the same shows an armature current control, wherein the motor is provided with field windings 80 and 81 connected with the armature 82 of the motor from opposite relative ends of the windings; the other ends of the windings 80 and 81 leading for suitable connection with relays 83 and 84 respectively. The windings of these relays 83 and 84 are suitably connected to a storage battery or other source of electric current 85. An armature 86 for the relays is pivoted at 87 and grounded at 88 in the same circuit with the ground 89 of the motor 85. The relay windings at their ends opposite their common connection are connected respectively with the strip contacts 74 and 75. The armature is conductively connected with the resistance coils 70 and 71 of the rheostats, and of course the sliding contacts 60 and 61 are grounded at 90. If desired the motor circuit designated generally at 91 may have a manually controlled rheostat 92 therein, and a closure switch 93.

In Figure 8 is shown a field current control for the motor, wherein the field windings 80ª and 81ª are connected at opposite relative ends with the armature 82ª and at the other end the said field coils are connected with the resistance coils 70 and 71 of the gyroscopically controlled rheostats. The armature 82ª is suitably connected as shown thru the conductor strips 74 and 75. The circuit 91ª includes a manually controlled rheostat 92ª and manually operated circuit maker and breaker 93ª; the circuit 91ª having the storage battery 85ª connected therein, one post of which is connected with the sliding contact arms and the brushes 62 and 63 carried thereby, and the circuit 91ª also being connected with the armature 82ª in the relation shown in Figure 8.

In order that the direction and speed of turn may be properly interpreted, a suitable reference index must be provided. The inclinometer F serves this purpose. It represents the pilot's view of a high wing monoplane in flight, and includes the horizontal wing bar or portion 94 connected by struts 95 to a portion 96 simulating the nose of the aircraft. This portion 96 is pivoted at 97 and the upper end of a bracket 98 is suitably mounted upon the casing of the instrument unit in any approved manner. A pendulum 99 is pivoted between its ends at 100 upon the rear of the bracket 98; the lower weighted end 101 thereof being positioned above the base 15. The upper end of the pendulum, above the pivot 100, is provided with a rearwardly extending pin 102 extending into a preferably vertical slot 103 provided in the portion 96 of the inclinometer, below the pivot 97 thereof. The pendulum 99 is provided with a suitable dash-pot 101ª to damp the oscillations.

It is of course understood that in any correctly banked turn the wing indicator 94 remains parallel to the artificial horizon bar 110 but a slip or skid is indicated by the angularity of the wing indicator 94 with respect to the bar 110. It is to be understood that as the screen element 20 passes the inclinometer, there is a very easily interpreted stimulus of the turn impressed upon the observer, due to the relative motion between the indicator F and the screen structure, which eliminates vertigo.

A glide indiactor G is preferably provided in a cooperative relation with the other instruments. It consists of a horizon bar 110, horizontally positioned in front of the screen element 20, and extending across the panel or window of the instrument case. At its ends it is provided with small pinions 111 operating over suitable racks 112 mounted on the inside front wall of the housing B. Brackets 113 prevent rearward movement of the horizon bar 110; the same serving to hold the teeth of the pinion 111 upon the teeth of the racks 112, in order to maintain the bar 110 horizontally. The bar is preferably a small tube, and it is operated by means of a capillary-leak type of statoscope, or any pressure sensitive apparatus which will move the tube in a rising and falling position proportionate to the rate of climb and descent of the aircraft, indicating in a co-relation with the features on the endless screen and the inclinometer F the climb and glide of the aircraft.

The means G includes the statoscope generally designated at 115, which includes the thermally sealed container 116, preferably of the double-wall type. One end of this container is provided with a hollow shaft 117 supported in any approved manner upon anti-friction bearings 118, and the duct 119 of which permits atmospheric pressure to enter the compartment of the thermally sealed container 116. In this container 116 the shaft 117 is provided with a pinion 120, the teeth of which engage a slidable rack 121 (Figure 10). Within the container 116 is disposed a pressure sensitive element 125, consisting of a diaphragm, sylphon bellows, or the like, one wall of which is mounted at 127 fixed with respect to a wall of the container 116, and the other wall 130 of which is movable responsive to variation in pressure, and is connected by means of a shank 131 with a connecting rod or link 132. The latter is pivoted at 133, preferably on a fixed pivot, and the opposite end has a pin and slot connection 134 with the rack 121. The interior of the sylphon bellows 125 is provided with a capillary air-leak 140. Externally of the thermally sealed container 116, the shaft 117 is provided with a lever arm or crank 141, best shown in Figure 3 of the drawings, which has a link connection at 142 with one end of a rocking lever 143. The latter is pivoted at 144 on a suitable bracket 145 mounted on the base 15 of the instrument housing B; the opposite end of the rocking lever 143 being pivoted at 147 to the lower end of a connecting rod 150. The upper end of the latter is connected to the horizon bar 110 between the ends of the latter. Assuming that the aircraft begins to climb, there is a reduction of atmospheric pressure in the casing 116, since the pressure in the container 116 will substantially be the same as external atmospheric pressure, by reason of the conduit or passageway 119. The sylphon or pressure sensitive cell 125 will momentarily expand, due to the fact that the pressure within the sylphon cannot equalize the atmospheric pressure immediately, because of the restriction of the capillary tube 140. This movement or expansion of the sylphon bellows causes movement of the shaft 117, through the linkage and gear mechanism above described, for a movement of the horizon bar 110 downwardly to indicate the climb. If the climb is extended, there will be a constant effort and equalization between the pressure in the sylphon and in the container 116, which will cause an extension or expansion of the sylphon. On the other hand, the lowering of altitude of the aircraft during glide or fall will operate the pressure sensitive element for causing a rise of the horizon bar 110 above the nose 96 to designate a fall, although the primary use of the horizon bar is to indicate a climb or glide.

As shown in the drawings, at the left margin of the instrument unit is disposed an altimeter H, with its scale arranged vertically, and at the opposite margin an air speed indicator K is mounted with its scale mounted vertically. The integrating turn device has the altimeter and air speed indicator or meter arranged in such manner that the pilot will be informed at a single glance of the relation and operation of the various instruments of the unit. It is due to facility of reading the same that they are arranged and described as shown.

The vertical type of air speed meter preferably has a semi-circular sliding index 160, which may be placed opposite a reading of the air speed scale at which it is desired to fly. The pointer of the air speed meter is constructed in semi-circular form, as shown at 161, so that when the air speed rises to a predetermined amount the semi-circular pointer will be opposite the semi-circular sliding index 160, and form a true circular object. The altimeter has a movable index 162, which may cooperate with the scale readings of the vertical altimeter in combination with a slidable index in the same manner as above described for the air speed meter.

The rate of climb and guide horizon bar 110 is movable relative to suitable graduations 170 designated in Figure 1 of the drawings on the surface of the front wall of the instrument board facing the pilot, adjacent to an end of the bar 110.

The operation of the apparatus will be apparent from the foregoing. It is quite apparent that the contact brushes of the gyroscopically controlled circuit maker and breaker will control the amount of current which flows through the rheostats to the motor. This of course controls not only the directional rotation of the motor, but the speed of rotation of the same. Correspondingly the speed of the endless screen will be controlled, and variations in intensity of precessing of the frame of the gyroscopic device will result in proportionate variation of current flow through the motor. By calibrating and balancing the electric circuit and the sensitivity of the gyroscope, the screen movement will correspond very closely to actual turn of the aircraft.

In the modified form of invention shown in Figure 12 of the drawings, the compass indicating element M is mounted at the top of the instrument unit, and the turn indicator E' is operated by the same gyroscope which preferably operates the circuit maker and breaker details controlling the motor which operates the screen, although a separate gyroscope may be provided if desired.

It is to be understood that the altimeter and air speed meter have their own operating mechanisms, which may be pressure sensitive elements or any other mechanism desired. It is due to their cooperative arrangement with respect to the details of the integrating device that their association is important.

It is of course apparent that the altimeter, air speed meter, and compass may be selectively grouped in any desired arrangement surrounding the integrating indicia, and if a turn and bank indicator is used with the integrator, the former may be used with the latter in any approved arrangement.

To indicate with facility the angular degree of turn of the aircraft, the clouds 25, 26, 27 and 28 may be formed in the shape of numerals 1—2—3—etc.; the spacing being in angular designations of 45°. If desired, the angular delineations may be placed on the screen as shown in Figure 1.

Various changes in the shape, size, and arrangement of parts may be made to the forms of invention herein shown and described, without departing from the spirit of the invention or the scope of the claims.

We claim:

1. In a bank and turn indicator for aircraft the combination of an endless belt turn indicating element, and gyroscopically controlled means for moving said belt according to the intensity, direction and substantial degree of angular turn of the aircraft upon which the indicator is mounted.

2. In a bank and turn indicator, the combination of a turn indicating element in the form of an endless belt, a motor having a driving connection with said belt, and actuating means for operatively controlling the motor including a gyroscope mounted to precess during turn, and switch means operated by the precessional movement of the gyroscope for determining movement of the motor.

3. In an aircraft flight instrument the combination of a movable screen having a horizon line designated thereon, means mounting said screen for rectilinear movement thereof within the vision of an observer, a reversible motor for driving said screen back and forth within the vision of the observer, and gyroscopic means for controlling the direction of operation of said motor.

4. In a bank and turn indicator for aircraft, the combination of a movable screen having a pictorial air view of ground, horizon and sky, motor means operatively connected for moving said screen to the right and left, and means controlled by a change in direction of movement of the aircraft for operating said motor means in relation to the direction of change of movement of the aircraft.

5. In an aerial flight determining instrument the combination of an endless belt having an artificial pictorial air view thereon, a reversible type of motor for driving the belt, and gyroscopic means for controlling the flow of current through said motor.

6. In a bank and turn indicator of the class described the combination of a belt, means mounting the belt for endless rotation, said belt having an artificial horizon depicted thereon and having thereon typical pictorial effects below and above the horizon representative of a pilot's view during flight.

7. In combination, a turn indicator surface having an artificial horizon thereon, gyroscopically controlled means for bodily moving said surface from left to right and vice versa in a line substantially parallel with the artificial horizon depicted thereon upon turning of an aircraft to which the turn indicator surface is attached, a movable bank indicator including a movable bank indicating element cooperatively and adjacently positioned in the same field of view as said turn indicator surface horizon, a movable element in the same field of view as said turn indicating surface horizon and bank indicator element, and means for bodily moving said movable element last mentioned transverse to the line of the turn indicator surface horizon upon rise and fall of the aircraft to which attached.

8. In a flight instrument for aircraft, the combination of a movable flexible belt having designations thereon typical of earth and sky views as normally seen by a pilot of an aircraft during clear weather flight, and gyroscopic means to operate said belt upon turning of the aircraft.

9. In an aerial flight instrument the combination of a supporting frame, a turn indicating screen having on its surface a typical aerial view as seen by an observer from an aircraft during clear weather, said surface as exposed to a pilot being in the form of a plane, a gyroscope, and means controlled by the gyroscope for bodily moving the screen from left to right with respect to an observer to indicate the direction of aircraft turn.

10. In an aerial flight instrument the combination of a supporting frame, a turn indicating screen having a surface provided with a typical aerial view as seen by an observer from an aircraft in clear weather, said screen having said surface on which the scene is depicted in the form of a plane, gyroscopically controlled means for bodily moving the screen from left to right and vice versa with respect to an observer to indicate the direction of aircraft turn, a tiltable inclinometer element pivotally mounted on the frame in the same field of view as the screen, an indicating element movable upon the frame in the same co-related view with the screen and inclinometer and movable in a line normal to the screen movement, and a climb and glide sensitive instrument for operating said last mentioned indicator.

11. In an aircraft instrument for facilitating blind flight the combination of a supporting frame, a movable screen having an observation surface depicting a normal earth and sky view of a pilot during flight, controlling means for moving the screen from left to right and vice versa in integrated proportion and direction with the turn of the aircraft to which the instrument is attached, means associated upon the instrument including a tiltable indicator for indicating the banking of the aircraft to which the instrument is attached, said indicator being placed in the pilot's co-related field of view with the screen.

12. In an aircraft instrument for facilitating blind flight the combination of a supporting frame, a movable screen having an observation surface depicting a normal earth and sky view of a pilot during flight, controlling means for moving the screen from left to right and vice versa in integrated proportion and direction with the turn of the aircraft to which the instrument is attached, means associated upon the instrument including a tiltable indicator for indicating the banking of the aircraft to which the instrument is attached, said indicator being placed in the pilot's co-related field of view with the screen, and means for indicating the angularity of the aircraft during climb and glide including an indicator element movable in a path normal to the path movement of the screen and in the co-related field of view of the pilot with the screen and tiltable indicator.

13. A flight indicator comprising means for representing an artificial horizon, means for representing a miniature aircraft adjacent to the artificial horizon, means for maintaining the one of said representations in visual registration and in parallel relation with the other during straight and level flight and for rocking one of the representations out of normal parallel relation with the other during banked turning movement of the actual aircraft in flight to indicate banking of the miniature aircraft representations relative to the artificial horizon, and means independent of said last-mentioned means and adapted to move the representation which is not adapted to be rocked above and below the other representation to correspond to the direction of pitching in flight.

14. A flight indicator comprising means for representing an artificial horizon, means for representing a miniature aircraft adjacent to the artificial horizon, means for representing sky scenery in appropriate relationship to the artificial horizon, means mounting the artificial horizon and miniature aircraft representations for relative angular movement and for rectilinear movement above and below each other, means responsive to banking and pitching movements in flight and adapted to cause relative movement of the miniature aircraft and artificial horizon representations simulating the changes in attitude of the actual supporting aircraft, means mounting the sky scenery representation for translatory movement along the artificial horizon representation in opposite directions, and means responsive to turning movement in flight and adapted to produce appropriate translatory movement of the sky scenery along the artificial horizon outward from the indicated direction of turn.

15. A flight indicator comprising a support, a movable member mounted on the support and bearing a representation of sky scenery, a second movable member positioned adjacent to the first member to mask a portion of the latter and having an artificial horizon line, means mounting the two members for relative translatory movement, a third movable member positioned adjacent to the first two members and bearing a representation of a miniature aircraft adapted to mask portions of the sky scenery and artificial horizon, means mounting the second and third members for relative angular movement and rectilinear movement above and below each other, means responsive to banking and pitching movements in flight and adapted to cause relative movement of the miniature aircraft and artificial horizon representations simulating the changes in attitude of the actual supporting aircraft, and means responsive to turning movement in flight and adapted to produce appropriate translatory movement of the sky scenery along the artificial horizon outward from the indicated direction of turn.

16. A flight indicator comprising a support, a movable member mounted on the support and bearing a representation of sky scenery, a second movable member positioned adjacent to the first member to mask a portion of the latter and having an artificial horizon line, means mounting the two members for relative translatory movement, a third movable member positioned adjacent to the first two members and bearing a representation of a miniature aircraft adapted to mask portions of the sky scenery and artificial horizon, means mounting the second and third members for relative angular movement and rectilinear movement above and below each other, means responsive to banking and pitching movements in flight and adapted to cause relative movement of the miniature aircraft and artificial horizon representations simulating the changes in attitude of the actual supporting aircraft, a reversible prime mover for the first movable member, and means responsive to turning movement in flight and adapted to start the prime mover and to determine the direction of movement of the latter to cause translatory movement of the sky scenery along the artificial horizon in a direction outward from the indicated direction of turn.

17. A flight indicator comprising a support, a movable member mounted on the support and bearing a representation of sky scenery, a second movable member positioned adjacent to the first member to mask a portion of the latter and having an artificial horizon line, means mounting the two members for relative translatory movement, a third movable member positioned adjacent to the first two members and bearing a representation of a miniature aircraft adapted to mask portions of the sky scenery and artificial horizon, means mounting the second and third members for relative angular movement and rectilinear movement above and below each other, means responsive to banking and pitching movements in flight and adapted to cause relative movement of the miniature aircraft and artificial horizon representations simulating the changes in attitude of the actual supporting aircraft, a reversible electric motor, means operatively connecting said motor to the first movable member to operate the same, a source of current, a normally open circuit connecting the source with the motor, a reversing switch connected in the electric circuit, and means responsive to turning movement in flight and adapted to close the reversing switch in that shifted position which will cause operation of the motor to translate the sky scenery along the artificial horizon in a direction opposite to the indicated direction of turn.

CARL J. CRANE.
WILLIAM C. OCKER.